United States Patent
Elliott et al.

(10) Patent No.: US 7,418,623 B2
(45) Date of Patent: Aug. 26, 2008

(54) APPARATUS AND METHOD TO RECONFIGURE A STORAGE ARRAY

(75) Inventors: John C. Elliott, Tucson, AZ (US); Shah Mohammad Rezaul Islam, Tucson, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 11/281,307

(22) Filed: Nov. 16, 2005

(65) Prior Publication Data

US 2007/0109883 A1    May 17, 2007

(51) Int. Cl.
*G06F 11/00*    (2006.01)
(52) U.S. Cl. ............................................. 714/7; 714/5
(58) Field of Classification Search ................. 714/5–9, 714/42, 54; 711/114, 170; 365/200
See application file for complete search history.

(56) References Cited

U.S. PATENT DOCUMENTS

| | | | |
|---|---|---|---|
| 5,146,588 A | | 9/1992 | Crater et al. |
| 5,301,297 A | | 4/1994 | Menon et al. |
| 5,566,316 A | * | 10/1996 | Fechner et al. ............... 711/114 |
| 5,632,012 A | * | 5/1997 | Belsan et al. ................... 714/6 |
| 5,951,691 A | * | 9/1999 | Ng et al. ......................... 714/5 |
| 6,598,174 B1 | * | 7/2003 | Parks et al. ..................... 714/6 |
| 6,725,392 B1 | * | 4/2004 | Frey et al. ....................... 714/6 |
| 6,880,101 B2 | * | 4/2005 | Golasky et al. ................. 714/4 |
| 7,017,107 B2 | * | 3/2006 | Talagala et al. ............. 714/819 |
| 7,028,216 B2 | * | 4/2006 | Aizawa et al. .................. 714/7 |
| 7,308,532 B1 | * | 12/2007 | Wood et al. .................. 711/112 |
| 2002/0194523 A1 | | 12/2002 | Ulrich et al. |
| 2003/0056142 A1 | | 3/2003 | Hashemi |
| 2003/0074599 A1 | * | 4/2003 | Golasky et al. ................ 714/6 |
| 2003/0231529 A1 | | 12/2003 | Hetrick et al. |
| 2004/0145939 A1 | * | 7/2004 | Yoshida et al. .............. 365/145 |
| 2005/0071390 A1 | * | 3/2005 | Midgley et al. ............. 707/204 |
| 2005/0114728 A1 | * | 5/2005 | Aizawa et al. .................. 714/6 |

\* cited by examiner

*Primary Examiner*—Dieu-Minh Le
(74) *Attorney, Agent, or Firm*—Dale F. Regelman; Quarles & Brady LLP

(57) ABSTRACT

A method is disclosed to reconfigure a storage array. The method supplies a data storage and retrieval system comprising (N) data storage device assemblies, wherein each of those (N) data storage device assemblies comprises (M) data storage devices, wherein (N) is greater than or equal to 2, and wherein (M) is greater than or equal to 2. The method configures those (N) data storage device assemblies to comprise a spare data storage device assembly and a first storage array comprising the remaining (N–1) data storage device assemblies. In the event Applicants' method detects a failed data storage device disposed in the first storage array, then the method forms a second storage array comprising the first storage array, except the failed data storage device, in combination with a data storage device disposed in the spare data storage device assembly.

16 Claims, 13 Drawing Sheets

APPARATUS AND METHOD TO RECONFIGURE A STORAGE ARRAY

FIELD OF THE INVENTION

This invention relates to an apparatus and method to reconfigure a storage array.

BACKGROUND OF THE INVENTION

Data storage and retrieval systems are used to store information provided by one or more host computer systems. Such data storage and retrieval systems receive requests to write information to a plurality of data storage devices, and requests to retrieve information from that plurality of data storage devices. Upon receipt of a read request, the system recalls information from the plurality of data storage devices, and optionally moves that information to a data cache. Thus, the system is continuously moving information to and from a plurality of data storage devices, and optionally to and from a data cache.

It is known in the art to configure the plurality of data storage devices to form a storage array. It is further known to write information to such a storage array using a number of RAID protocols.

In order to reduce the physical size and/or cost of the data storage and retrieval system, what is needed is a data storage and retrieval system wherein the plurality of data storage devices comprises two or more data storage device assemblies, wherein each of those assemblies comprises two or more data storage devices. What is further needed is a method to reconfigure a data storage array comprising a plurality of data storage device assemblies upon the failure of a data storage device disposed in one of those data storage device assemblies.

SUMMARY OF THE INVENTION

Applicants' invention comprises a method to reconfigure a storage array. Applicants' method supplies a data storage and retrieval system comprising (N) data storage device assemblies, wherein each of said (N) data storage device assemblies comprises (M) data storage devices, wherein (N) is greater than or equal to 2, and wherein (M) is greater than or equal to 2. The method configures those (N) data storage device assemblies to comprise a spare data storage device assembly and a first storage array comprising the remaining (N−1) data storage device assemblies.

In the event Applicants' method detects a failed data storage device disposed in the first storage array, then the method forms a second storage array comprising the first storage array in combination with a data storage device disposed in the 'spare data storage device assembly, where that second storage array does not comprise the failed data storage device.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in an information storage and retrieval system which comprises a plurality of data storage device assemblies, wherein each of those data storage device assemblies comprises a plurality of data storage devices.

Figure 1:
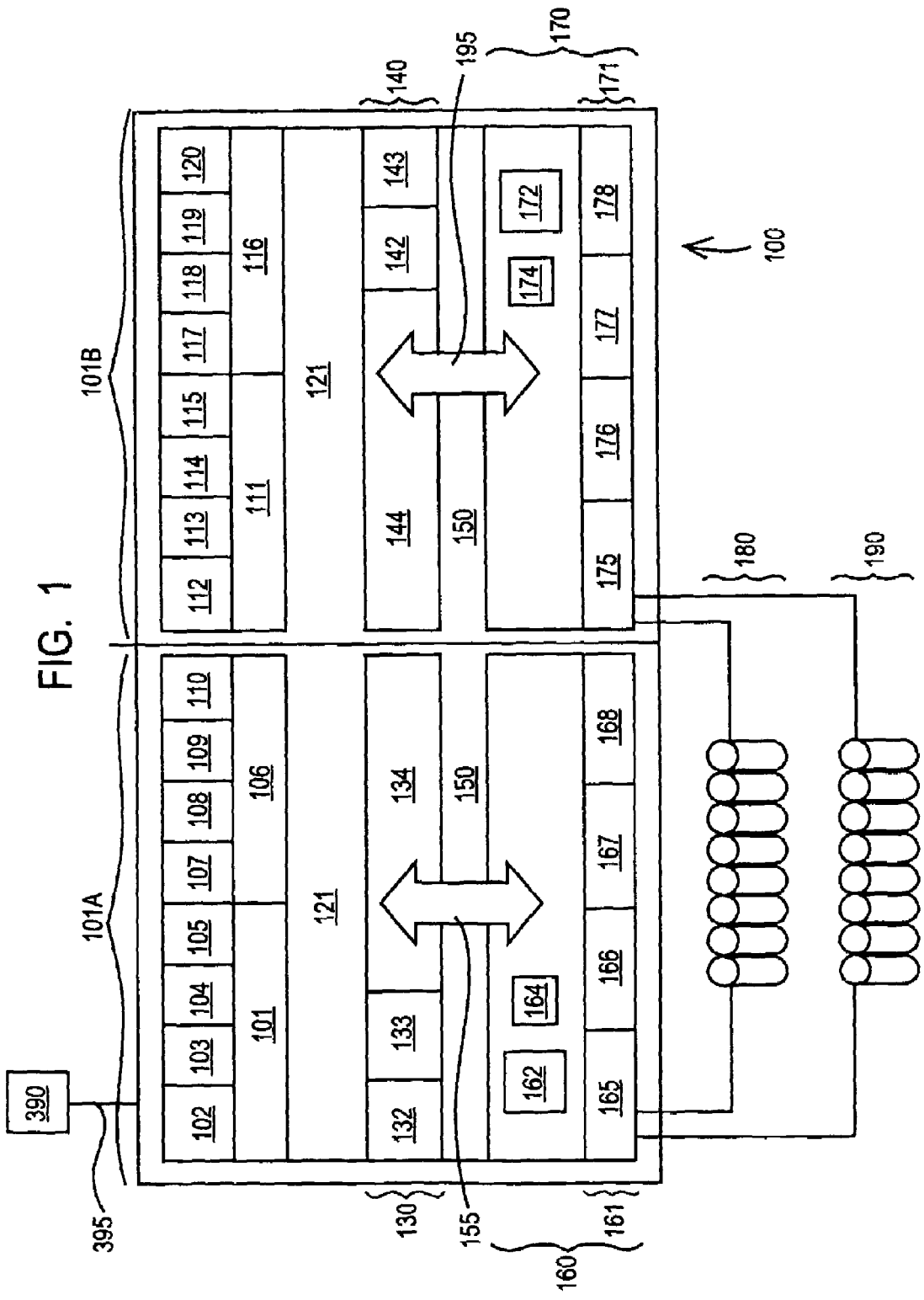
FIG. 1 is a block diagram showing one embodiment of Applicants' data storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, host computer 390 further includes a storage management program. The storage management program in the host computer 390 may include the functionality of storage management type programs known in the art that manage the transfer of data to and from a data storage and retrieval system, such as the IBM DFSMS implemented in the IBM MVS operating system.

In certain embodiments, Applicants' information storage and retrieval system includes a plurality of host adapters. In the illustrated embodiment of FIG. 1, system 100 comprises host adapters 102-105, 107-110, 112-115 and 117-120. In other embodiments, Applicants' information storage and retrieval system includes fewer than 16 host adapters. In still other embodiments, Applicants' information storage and retrieval system includes more than 16 host adapters. In certain embodiments, one or more of the host adapters are multi-ported. Regardless of the number of host adapters disposed in any embodiments of Applicants' system, each of those host adapters comprises a shared resource that has equal access to both central processing/cache elements 130 and 140.

Each host adapter may comprise one or more Fibre Channel ports, one or more FICON ports, one or more ESCON ports, or one or more SCSI ports, and the like. Each host adapter is connected to both clusters through interconnect bus 121 such that each cluster can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters 161 which in the illustrated embodiment of FIG. 1 comprises device adapters 165, 166, 167, and 168. I/O portion 160 further comprise nonvolatile storage ("NVS") 162 and battery backup 164 for NVS 162.

I/O portion 170 comprises a plurality of device adapters 171 which in the illustrated embodiment of FIG. 1 comprises device adapters 175, 176, 177, and 178. I/O portion 170 further comprises nonvolatile storage ("NVS") 172 and battery backup 174 for NVS 172.

In certain embodiments of Applicants' system, one or more host adapters, processor portion 130, and one or more device adapters are disposed on a first control card disposed in Applicants' information storage and retrieval system. Similarly, in certain embodiments, one or more host adapters, processor portion 140, one or more device adapters are disposed on a second control card disposed in Applicants' information storage and retrieval system.

In the illustrated embodiment of FIG. 1, sixteen data storage devices are organized into two arrays, namely array 180 and array 190. The illustrated embodiment of FIG. 1 shows two storage device arrays.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID.

In certain embodiments, arrays 180 and 190 comprise what is sometimes called an SBOD array, i.e. "Switched Bunch Of Disks".

The illustrated embodiment of FIG. 1 shows two storage device arrays. In other embodiments, Applicants' system includes a single storage device array. In yet other embodiments, Applicants' system includes more than two storage device arrays.

Figure 2:
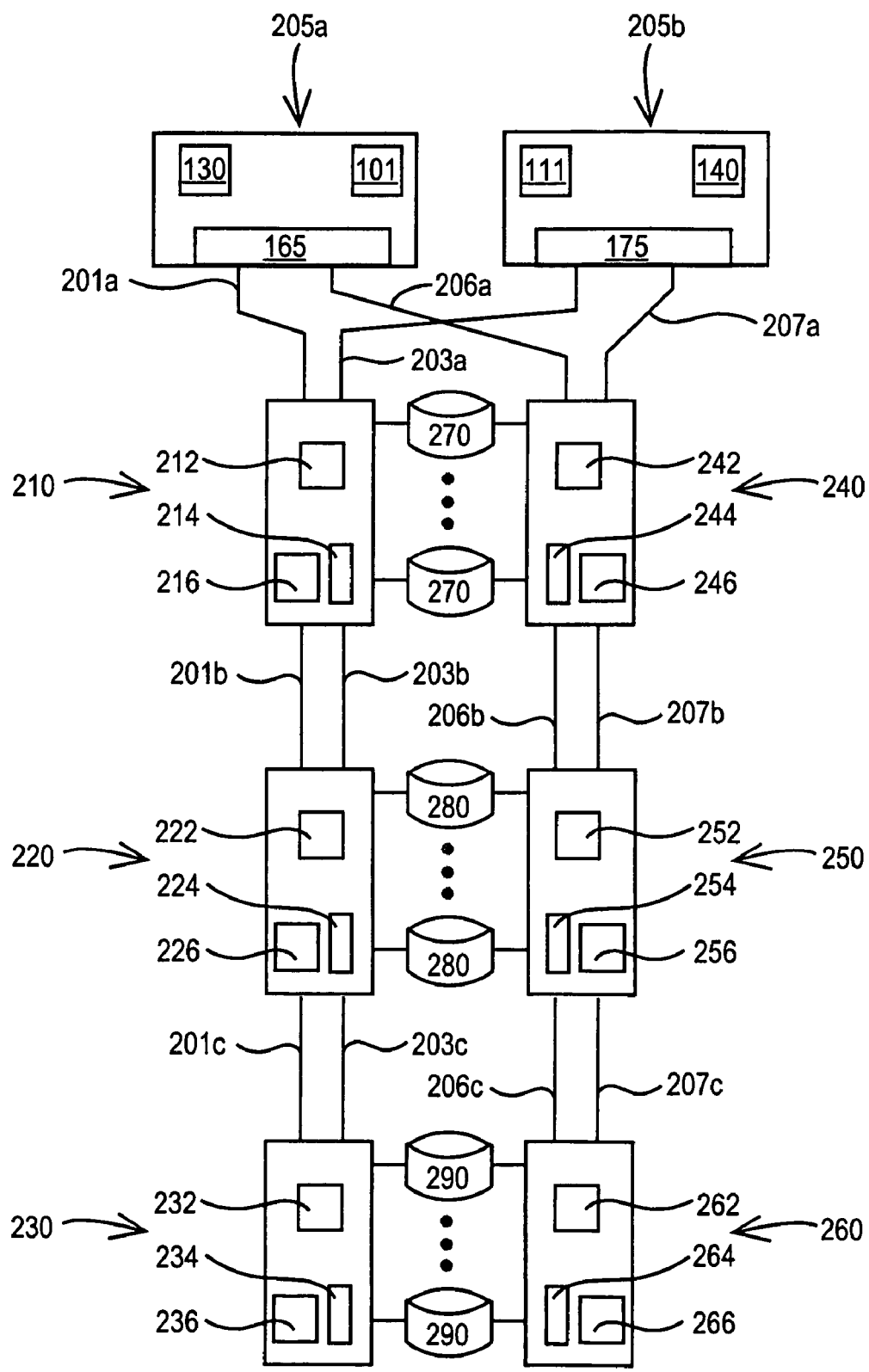
FIG. 2 is a block diagram showing the data storage and retrieval system of FIG. 1 comprising two initiators and a plurality of data storage devices.

In the illustrated embodiment of FIG. 2, Applicants' information storage and retrieval system comprises dual fibre channel arbitrated ("FC-AL") loops of switches where initiator 205a and initiator 205b are interconnected with two FC-AL loops. The illustrated embodiment of FIG. 2 should not be construed to limit Applicants' invention to use of fibre channel networks or devices. In the illustrated embodiment of FIG. 2, the recitation of two FC-AL loops comprises one embodiment of Applicants' apparatus. In other embodiments, other network topologies and devices are utilized, including without limitation SAS devices and/or SATA devices.

In the illustrated embodiment of FIG. 2, initiator 205a comprises plurality of host adapters 101 (FIGS. 1, 2), control element 130 (FIGS. 1, 2), and device adapter 165 (FIGS. 1, 2). In the illustrated embodiment of FIG. 2, initiator 205b comprises plurality of host adapters 111 (FIGS. 1, 2), control element 140 (FIGS. 1, 2), and device adapter 175 (FIGS. 1, 2).

Each FC-AL loop contains one or more local controllers, such as local controllers 210, 220, 230, 240, 250, and 260. Each local controller comprises a switch, a processor, and microcode. In certain embodiments, the switch comprises a Fibre Channel switch. In certain embodiments, the processor comprises a SES processor. For example, local controllers 210, 220, 230, 240, 250, and 260, include processors 212, 222, 232, 242, 252, and 262, respectively. Similarly, local controllers 210, 220, 230, 240, 250, and 260, include switches 214, 224, 234, 244, 254, and 264, respectively. In addition, local controllers 210, 220, 230, 240, 250, and 260, include microcode 216, 226, 236, 246, 256, and 266, respectively.

Local controller 210 in combination with plurality of data storage devices 270 comprises a first switch domain. Local controller 240 in combination with plurality of storage devices 270 comprises a second switch domain.

Figure 3A:
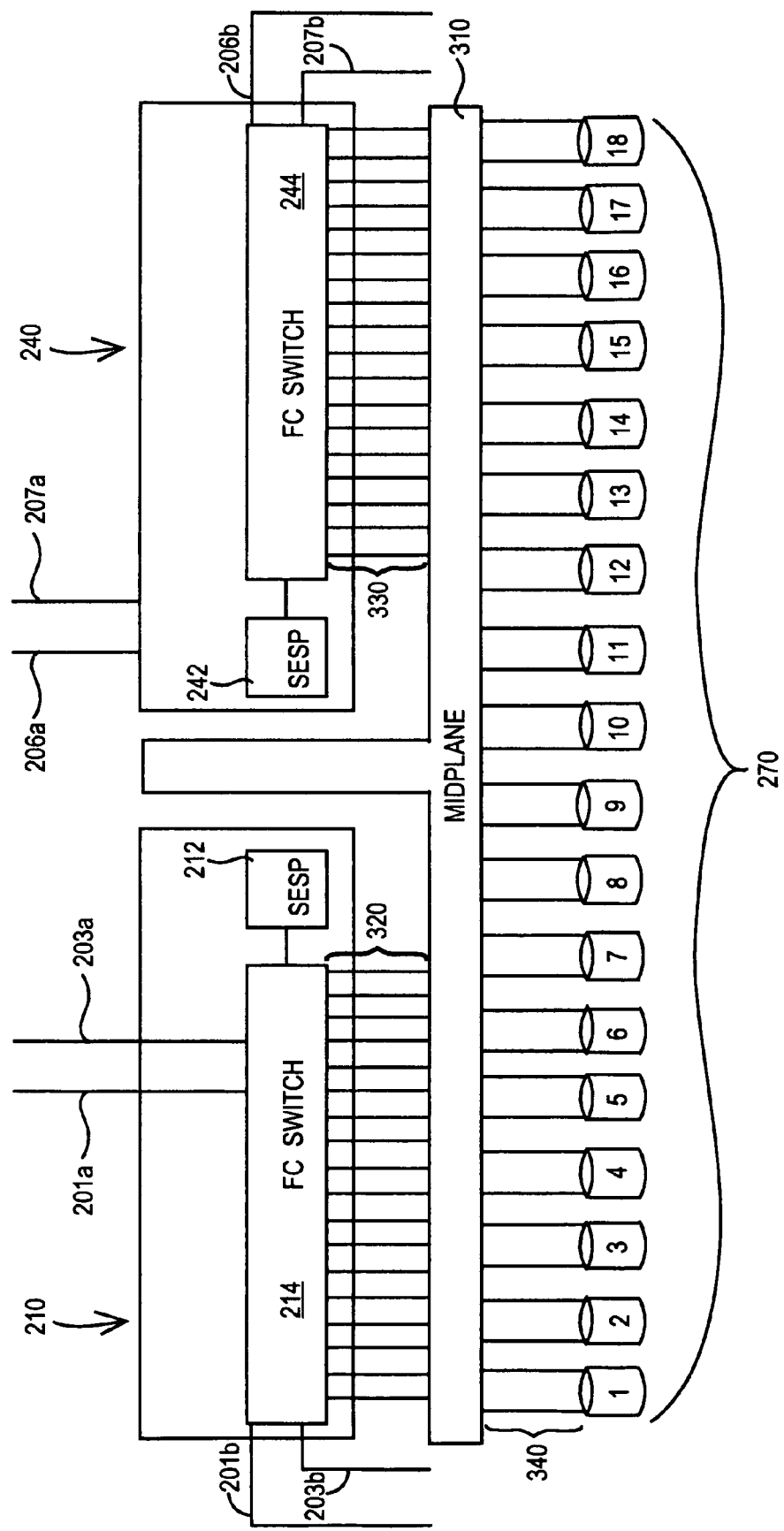
FIG. 3A is a block diagram showing a plurality of data storage devices interconnected to a fibre channel arbitrated loop switch.

Referring now to FIG. 3A, in certain embodiments Applicants' apparatus further includes a midplane interconnecting one or more switches to one or more data storage devices. In the illustrated embodiment of FIG. 3A, controller 210 (FIGS. 2, 3) comprises Fibre Channel switch 214 (FIGS. 2, 3) and SES processor 212 (FIGS. 2, 3). A plurality of communication links 320 interconnect Fibre Channel switch 214 to midplane 310. A plurality of communication links 340 interconnect data storage devices 270 (FIGS. 2, 3) with midplane 310.

Controller 240 (FIGS. 2, 3) comprises Fibre Channel switch 244 (FIGS. 2, 3) and SES processor 242 (FIGS. 2, 3). A plurality of communication links 330 interconnect Fibre Channel switch 244 to midplane 310.

Signals are provided by switch 214 to data storage devices 270 via communication links 320, communication links 340, and midplane 310. Similarly, signals are provided by switch 244 to data storage devices 270 via communication links 330, communication links 340, and midplane 310.

Figure 3B:
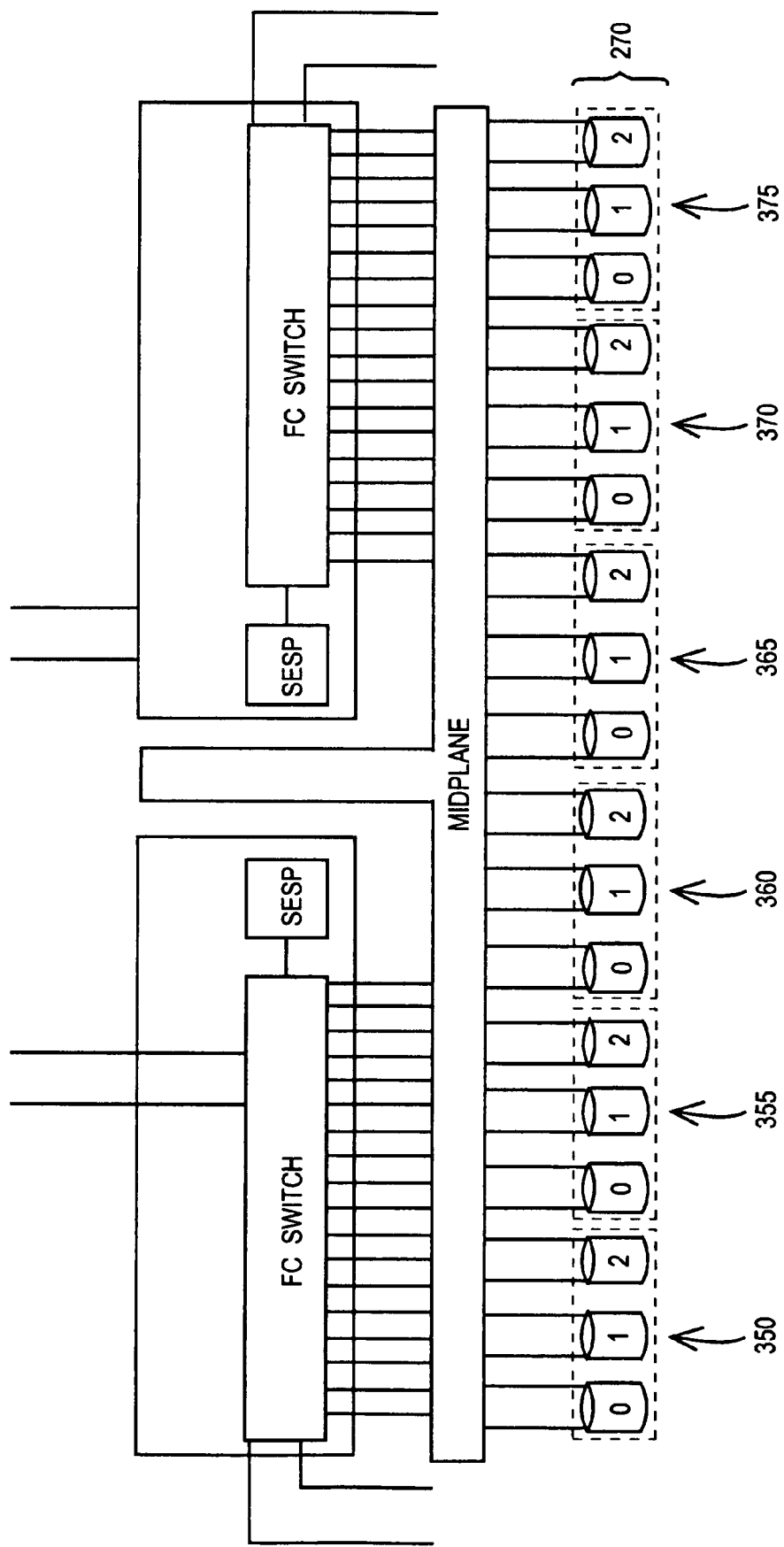
FIG. 3B is a block diagram showing the plurality of data storage devices of FIG. 3A comprising six data storage device assemblies.

In the illustrated embodiment of FIG. 3B, data storage devices 270 are disposed in six separate data storage device assemblies. Referring to FIGS. 3A and 3B, data storage devices 1, 2, and 3 of FIG. 3A comprise data storage device assembly 350 of FIG. 3B. Data storage devices 4, 5, and 6 of FIG. 3A comprise data storage device assembly 355 of FIG. 3B. Data storage devices 7, 8, and 9 of FIG. 3A comprise data storage device assembly 360 of FIG. 3B. Data storage devices 10, 11, and 12 of FIG. 3A comprise data storage device assembly 365 of FIG. 3B. Data storage devices 13, 14, and 15 of FIG. 3A comprise data storage device assembly 370 of FIG. 3B. Data storage devices 16, 17, and 18 of FIG. 3A comprise data storage device assembly 375 of FIG. 3B.

In certain embodiments, data storage device assemblies 350, 355, 360, 365, 370, and 375, comprise logical groupings of data storage devices. In certain embodiments, data storage device assemblies 350, 355, 360, 365, 370, and 375, comprise physical groupings of data storage devices, wherein each physical grouping comprises three data storage devices and the associated interconnections for those three data storage devices with midplane 310.

In certain embodiments, each such physical grouping of data storage devices comprises an integral assembly. In certain embodiments, each such physical grouping of data storage devices comprises a service boundary, wherein a repair or replacement of any one data storage device disposed in that assembly requires removal of the entire data storage device assembly from Applicants' data storage and retrieval system.

Figure 4:
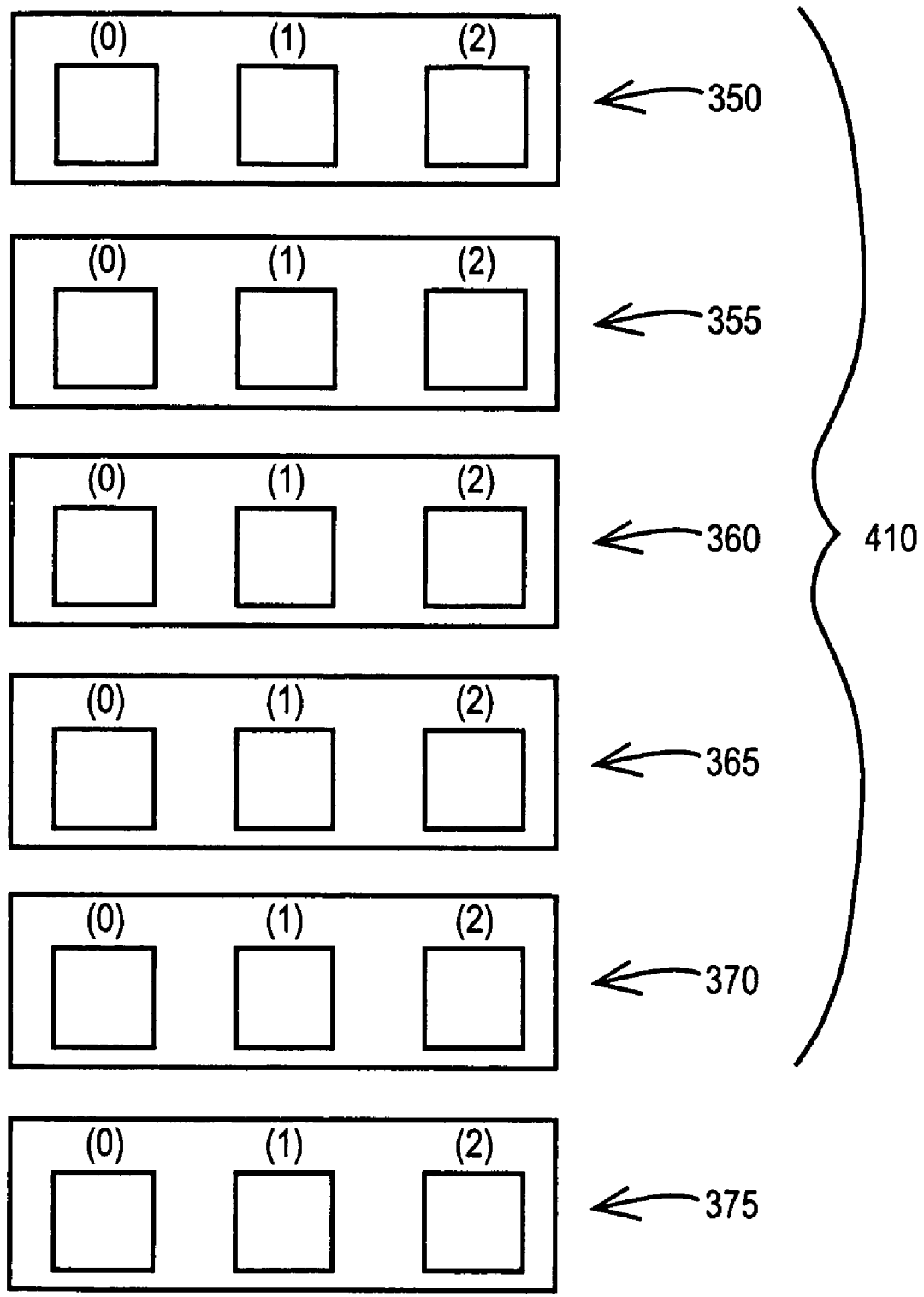
FIG. 4 is a block diagram showing the six data storage device assemblies of FIG. 3B, and a first storage array comprising five of those six assemblies, and a spare data storage device assembly.

FIG. 4 shows the six data storage device assemblies of FIG. 3B. Referring now to FIGS. 3B and 4, the address, configuration, and status of each data storage device assembly is known and monitored by SES processor 212 and SES processor 242. Referring now to FIGS. 2 and 3, SES processors 212 and 242 report the status of each data storage device assembly, and of each data storage device disposed in those assemblies, to initiators 205a (FIG. 2) and initiator 205b (FIG. 2).

Applicants' invention comprises a method to reconfigure a storage array comprising (N) storage device assemblies, wherein each of those (N) storage device assemblies comprises (M) data storage devices. For example, in the illustrated embodiment of FIG. 4, storage array 410 comprises five (5) separate storage device assemblies, wherein each of those five (5) assemblies comprises three (3) data storage devices. This being the case, in the illustrated embodiment of FIG. 4, (N) is 5 and (M) is 3.

Figure 10:
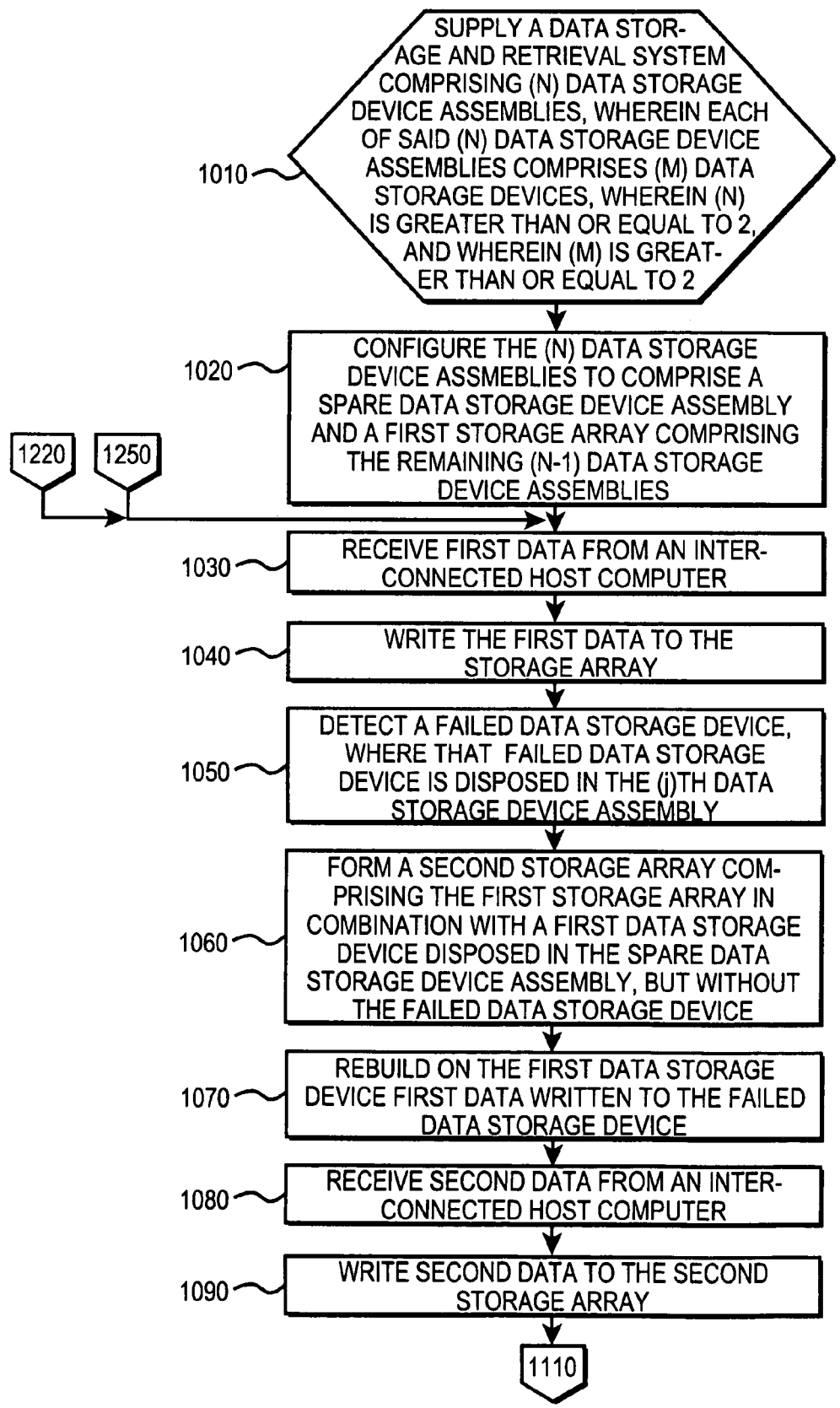
FIG. 10 is a flow chart summarizing certain steps of Applicants' method.

Referring now to FIG. 10, in step 1010 Applicants' method provides a data storage and retrieval system comprising (N) data storage device assemblies, wherein each of those data storage device assemblies comprises (M) data storage devices, wherein (N) is greater than or equal to 2, and wherein (M) is greater than or equal to 2. As an example, in the illustrated embodiment of FIG. 4 Applicant's data storage and retrieval system comprises six (6) data storage device assemblies wherein each of those assemblies comprises three (3) data storage devices. In certain embodiments, the data storage and retrieval system of step 1010 is owned and/or operated by a data storage services provider, wherein that provider provides data storage services to one or more data storage services customers.

In step 1020, Applicants' method configures the (N) data storage device assemblies to comprise a spare storage device assembly and a first storage array comprising the remaining (N−1) data storage device assemblies. In the illustrated embodiment of FIG. 4, data storage device assemblies 350, 355, 360, 365, and 370, are configured in storage array 410. Data storage device assembly 375 comprises a spare data storage device assembly, wherein the data storage devices comprising assembly 375 are spare drives, such that those spare drives are not configured in storage array 410.

In certain embodiments, step 1020 is performed by a processor, such as processor 132 (FIG. 1) or processor 142 (FIG. 1) disposed in the data storage and retrieval system. In certain embodiments, step 1020 is performed by an initiator, such as initiator 205a (FIG. 2) or initiator 205b (FIG. 2), disposed in the data storage and retrieval system. In certain embodiments, step 1020 is performed by a host computer in communication with Applicants' data storage and retrieval system.

In step 1030, Applicants' data storage and retrieval system receives first data from an interconnected host computer. In certain embodiments, the first data of step 1030 comprises customer data provided to Applicants' data storage and retrieval system from a customer's host computer.

In step 1040, Applicants' method writes the first data of step 1030 to the first storage array of step 1020. In certain embodiments, step 1040 comprises writing that first data to the first storage array using a RAID protocol. In certain embodiments, that RAID protocol comprises, without limitation, a RAID 1 protocol. In certain embodiments, that RAID protocol comprises, without limitation, a RAID 5 protocol. In certain embodiments, that RAID protocol comprises, without limitation, a RAID 10 protocol. In certain embodiments, step 1040 comprises writing that first data to the first storage array using a customer-defined storage protocol, wherein that customer-defined storage protocol comprises writing the first data to more than 1 data storage device.

Figure 5:
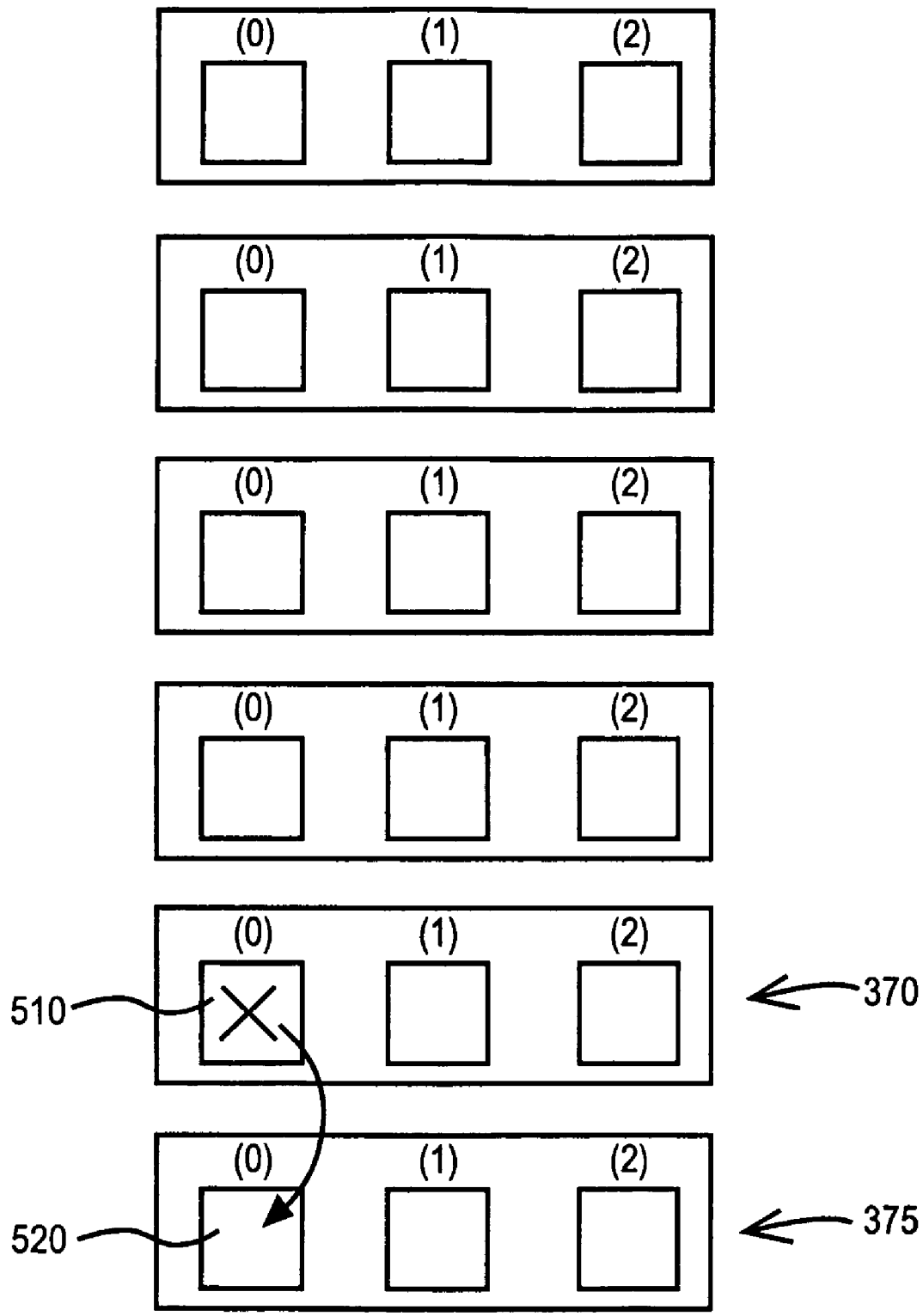
FIG. 5 is a block diagram showing a failed data storage device disposed in the storage array of FIG. 4, and illustrating a portion of Applicants' method wherein the data written to the failed device is rebuilt to a data storage device disposed in the spare data storage device assembly.

Referring now to FIGS. 5 and 10, in step 1050 Applicants' method detects a failed data storage device, such as storage device 510, where the first storage array of step 1020, such as storage array 410 (FIG. 4), comprises that failed device. In certain embodiments, step 1050 is performed by an SES processor, such as SES processor 212 (FIG. 2), or SES processor 222 (FIG. 2), or SES processor 232 (FIG. 2), or SES processor 242 (FIG. 2), or SES processor 252 (FIG. 2), or SES processor 262 (FIG. 2), in communication with the failed device. In certain embodiments, step 1050 is performed by a Storage RAID Controller Initiator, such as initiator 205a (FIG. 2) or initiator 205b (FIG. 2).

Applicants' method transitions from step 1050 to step 1060 wherein the method forms a second storage array comprising the first storage array in combination with a spare data storage device, such as storage device 520 (FIG. 5), disposed in the spare data storage device assembly, such as assembly 375 (FIG. 4), where that second storage array does not comprise the failed data storage device, such as device 510 (FIG. 5). In certain embodiments, step 1060 is performed by a processor, such as processor 132 (FIG. 1) or 142 (FIG. 1), disposed in the data storage and retrieval system. In certain embodiments, step 1060 is performed by an initiator, such as initiator 205a (FIG. 2) or initiator 205b (FIG. 2), disposed in the data storage and retrieval system. In certain embodiments, step 1060 is performed by a host computer in communication with Applicants' data storage and retrieval system.

Applicants' method transitions from step 1060 to step 1070 wherein the method rebuilds the first data written to the failed data storage device, such as data storage device 510 (FIG. 5), to the newly added data storage device, such as device 520 (FIG. 5), configured in the second storage array of step 1060. In certain embodiments, the rebuilding method of step 1070 is a function of the storage protocol selected in step 1040. For example, if using a RAID 1 protocol, then step 1070 comprises identifying the "mirrored" storage device for the failed storage device, and copying the data from that "mirrored" device to the newly-selected data storage device of step 1060. On the other hand, if a RAID 5 protocol is selected in step 1040, then step 1070 comprises rebuilding the data written to the failed data storage device using XOR functions and method known to those of skill in the art.

In certain embodiments, step 1070 is performed by a processor, such as processor 132 (FIG. 1) or processor 142 (FIG. 1), disposed in the data storage and retrieval system. In certain embodiments, step 1070 is performed by an initiator, such as initiator 205*a* (FIG. 2) or initiator 205*b* (FIG. 2), disposed in the data storage and retrieval system. In certain embodiments, step 1070 is performed by a host computer in communication with Applicants' data storage and retrieval system.

In step 1080, Applicants' data storage and retrieval system receives second data, i.e. data receiving after configuring the second storage array of step 1060. In certain embodiments, the second data of step 1080 comprises customer data provided by one or more customer owned and/or operated host computers in communication with Applicants' data storage and retrieval system, such as system 100. Applicants' method transitions from step 1080 to step 1090 wherein Applicants' method writes the second data of step 1080 to the second storage array of step 1060.

Figure 6:
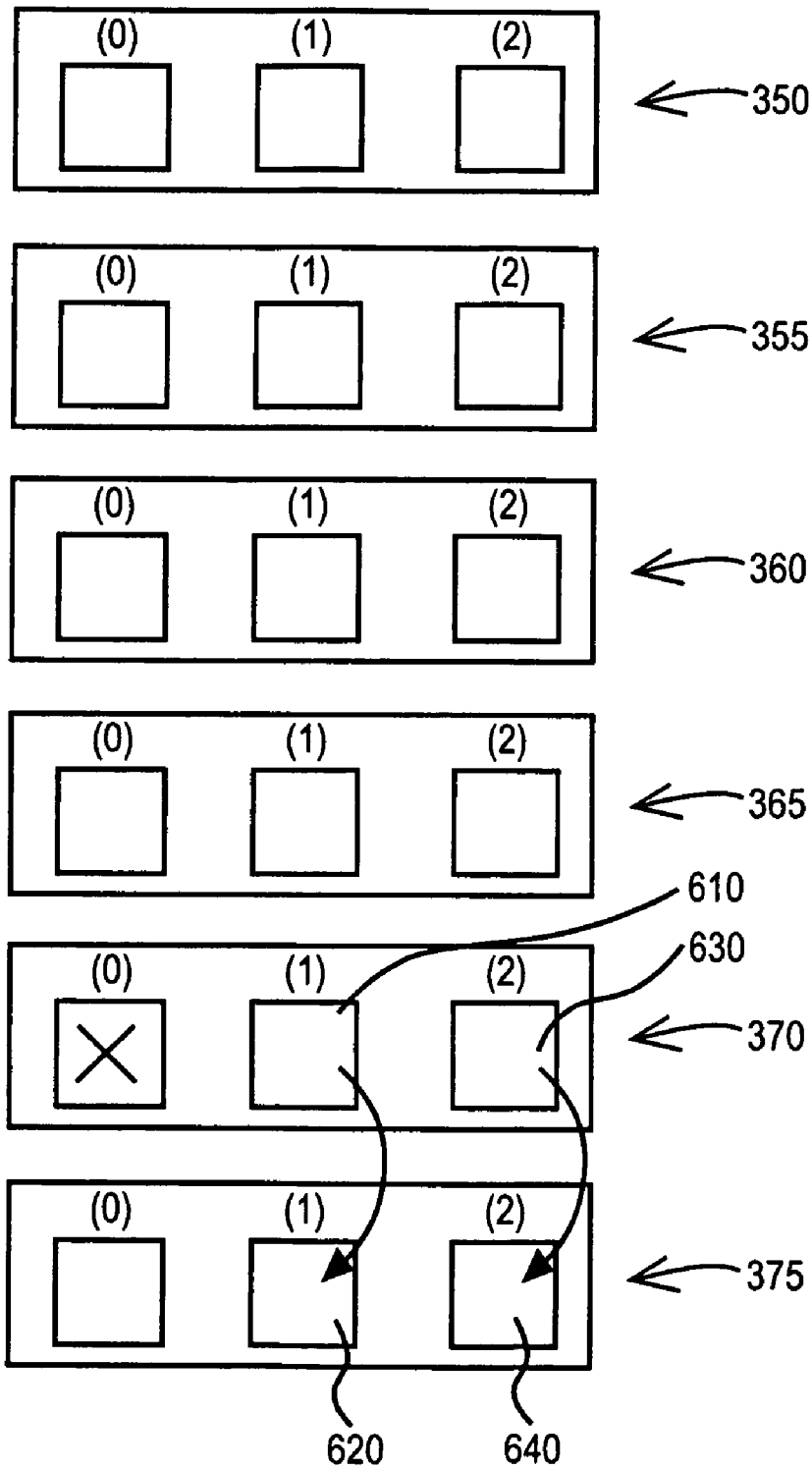
FIG. 6 is a block diagram illustrating a portion of Applicants' method wherein data written to each operable data storage devices disposed in the data storage device assembly comprising the failed data storage device is copied to a different data storage device disposed in the spare data storage device assembly.

In certain embodiments, Applicants' method ends at step 1090. In other embodiments and referring now to FIGS. 6 and 11, Applicants' method transitions from step 1090 to step 1110 wherein the method copies the first data and second data written to each operative data storage device, such as data storage devices 610 and 630, disposed in the data storage device assembly comprising the failed data storage device, such as data storage device assembly 370, to a different data storage device, such as devices 620 and 640, disposed in the data storage device assembly, such as assembly 375, comprising the data storage device, such as device 520 (FIG. 5), configured in the second array in step 1060 (FIG. 10).

Figure 7:
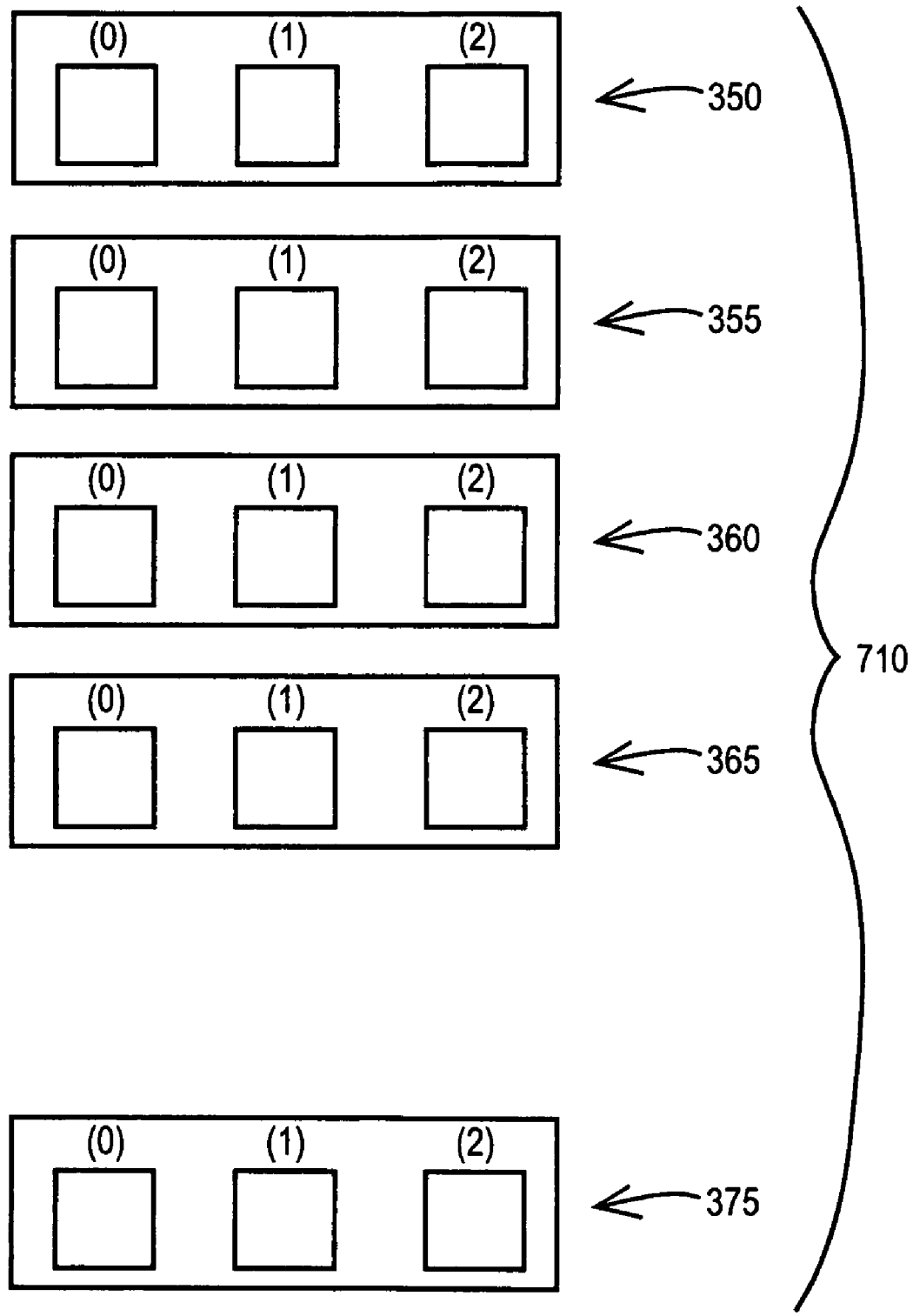
FIG. 7 is a block diagram showing a new storage array comprising the previously designated spare data storage device assembly.

Applicants' method transitions from step 1110 to step 1120 wherein the method forms a third storage array, such as storage array 710 (FIG. 7), comprising the first storage array in combination with the spare data storage assembly, such as assembly 375, wherein that third storage array does not comprise the data storage assembly, such as assembly 370, comprising the failed data storage device, such as device 510. In certain embodiments, step 1120 is performed by a processor, such as processor 132 (FIG. 1), or processor 142 (FIG. 1), disposed in the data storage and retrieval system. In certain embodiments, step 1120 is performed by an initiator, such as initiator 205*a* (FIG. 2) or initiator 205*b* (FIG. 2), disposed in the data storage and retrieval system. In certain embodiments, step 1120 is performed by a host computer in communication with Applicants' data storage and retrieval system.

In step 1130, Applicants' method removes the data storage device assembly comprising the failed data storage device from Applicants' data storage and retrieval system. In certain embodiments, step 1130 is performed by the owner/operator of the data storage and retrieval system. In other embodiments, step 1130 is performed by field service personnel.

In step 1140, Applicants' method determines if the failed data storage device can be repaired. In certain embodiments, step 1140 further comprises determining if the failed data storage device can be timely repaired, i.e. repaired within a desired time interval. If Applicants' method determines in step 1140 that the failed data storage device cannot be repaired, or cannot be repaired within a desired time interval, then the method transitions from step 1140 to step 1150 wherein the method provides a replacement data storage device. Applicants' method transitions from step 1150 to step 1160 wherein the method repairs the data storage device assembly removed in step 1130 using the replacement data storage device of step 1150. Applicants' method transitions from step 1160 to step 1180, If Applicants' method determines in step 1140 that the failed data storage device can be repaired, or repaired within a desired time interval, then the method transitions from step 1140 to step 1170 wherein the method repairs the failed data storage device. Applicants' method transitions from step 1170 to step 1180 wherein the method installs in the data storage and retrieval system the data storage device assembly comprising the repaired/replaced data storage device 820 (FIG. 8).

Applicants' method transitions from step 1180 to step 1210 (FIG. 12) wherein the method determines whether to reconfigure the third storage array of step 1120. In certain embodiments, step 1210 (FIG. 12) is performed by the owner/operator of the data storage and retrieval system. In certain embodiments, step 1210 (FIG. 12) is performed by a host computer in communication with Applicants' data storage and retrieval system.

Figure 8:
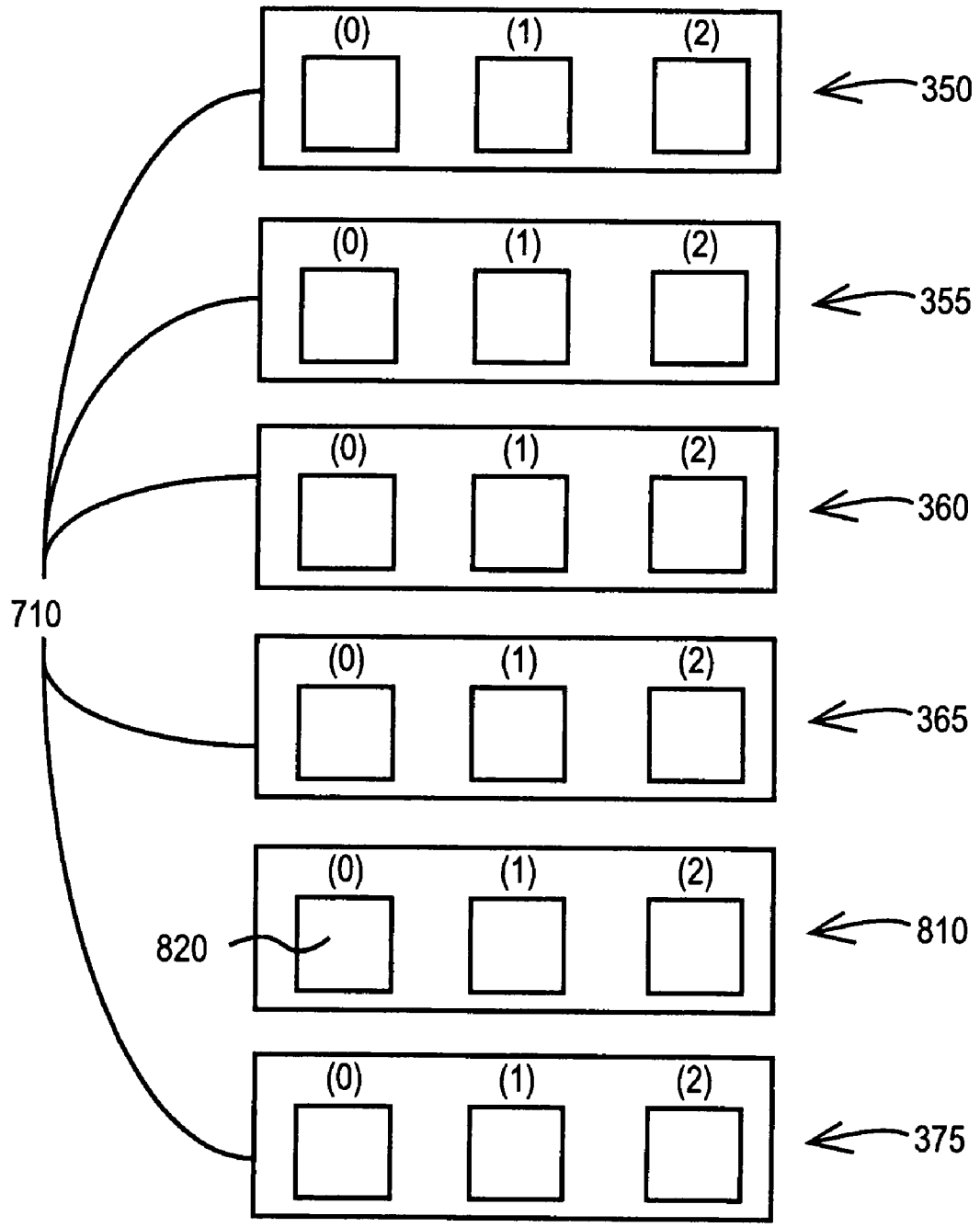
FIG. 8 shows a plurality of data storage devices, where that plurality comprises the storage array of FIG. 7 and a repaired data storage device assembly now designated as a spare assembly.
Figure 9:
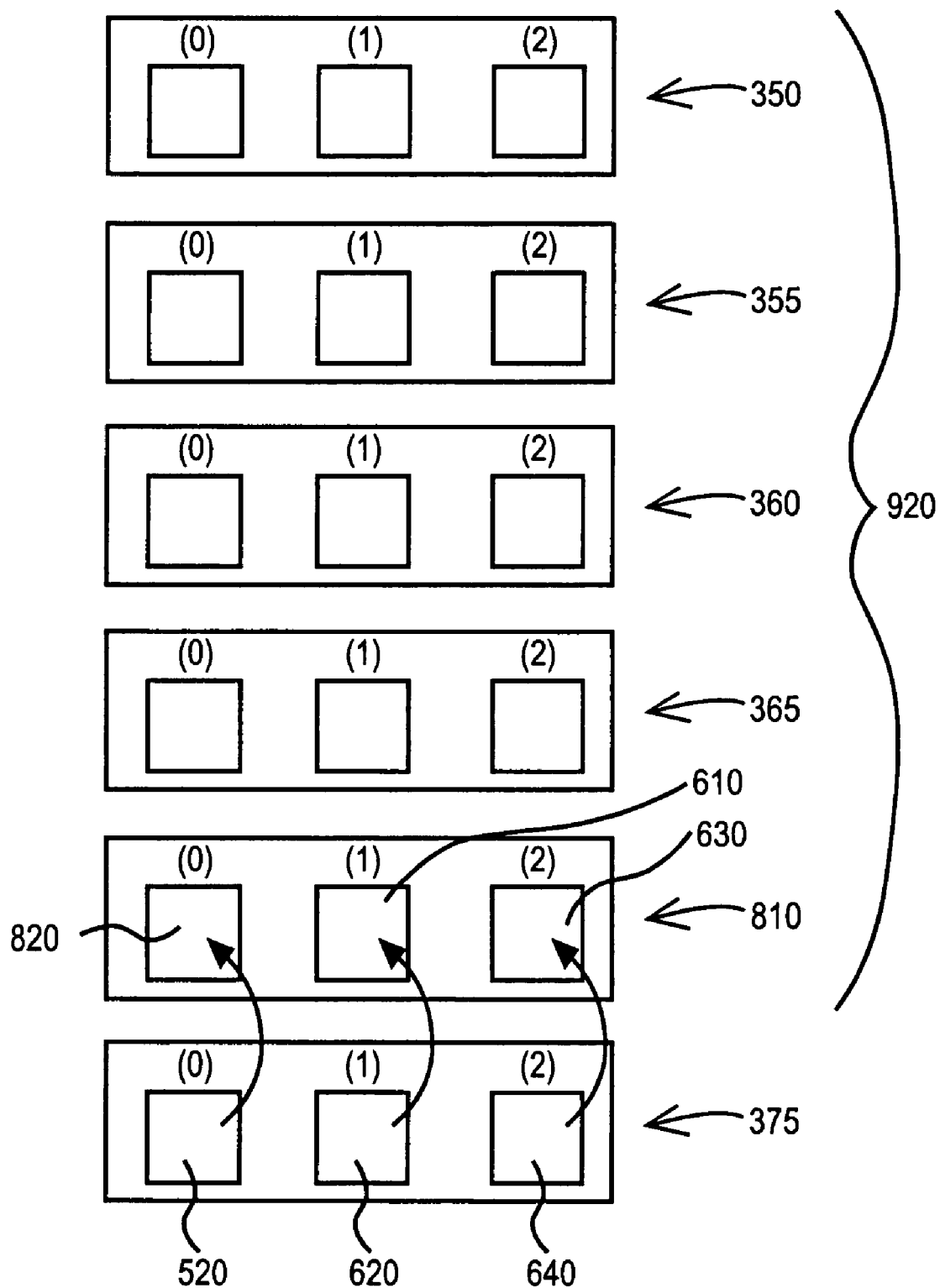
FIG. 9 shows a new storage array comprising the repaired data storage device assembly.
Figure 12:
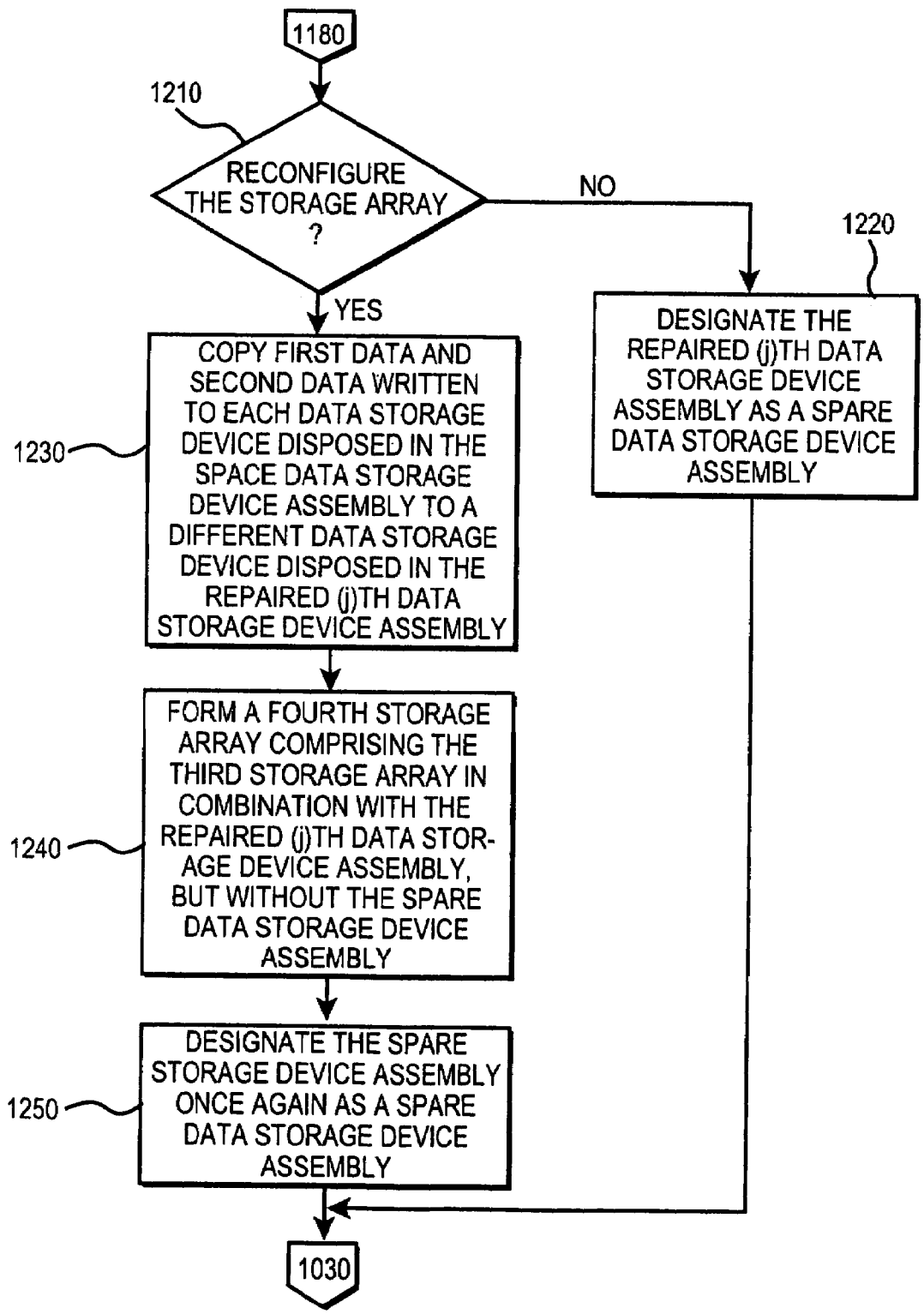
FIG. 12 is a flow chart summarizing additional steps of Applicants' method.

Referring to FIGS. 8 and 12, if Applicants' method elects not to reconfigure the third storage array, then the method transitions from step 1210 to step 1220 wherein the method designates the data storage device assembly installed in step 1180, such as assembly 810, as a spare data storage device assembly. In certain embodiments, step 1220 is performed by a processor, such as processor 132 (FIG. 1) or processor 142 (FIG. 1), disposed in the data storage and retrieval system. In certain embodiments, step 1220 is performed by an initiator, such as initiator 205*a* (FIG. 2) or initiator 205*b* (FIG. 2), disposed in the data storage and retrieval system. In certain embodiments, step 1220 is performed by a host computer in communication with Applicants' data storage and retrieval system. Applicants' method transitions from step 1220 to step 1030 and continues as described herein.

Figure 11:
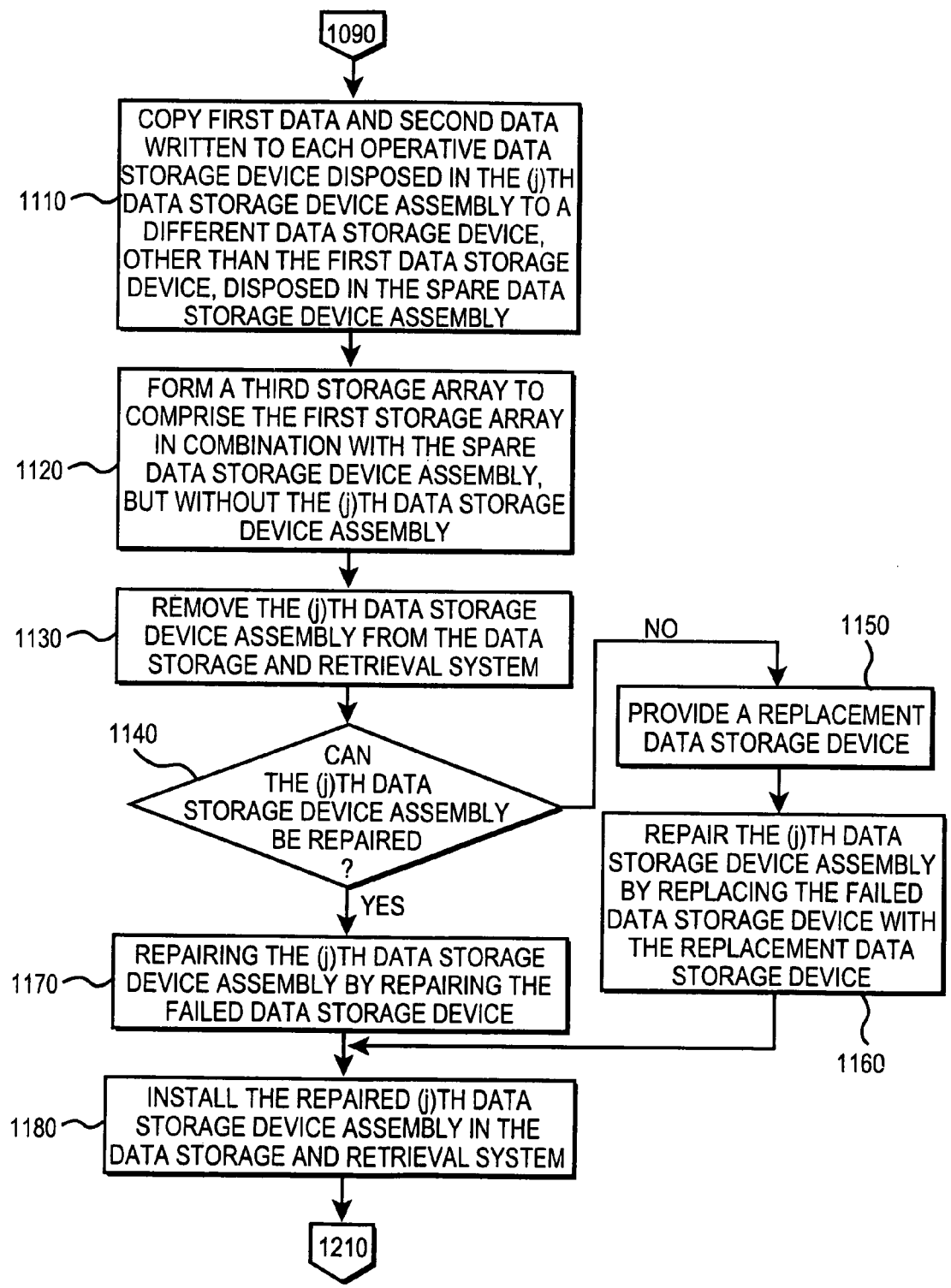
FIG. 11 is a flow chart summarizing additional steps of Applicants' method.

Referring now to FIGS. 8, 9, 10, 11, and 12, if Applicants' method elects to reconfigure the third storage array of step 1120 to comprise the data storage device assembly installed in step 1180, then the method transitions from step 1210 to step 1230 wherein the method copies the first and second data written to each data storage device disposed in the spare data storage device assembly of step 1020 (FIG. 10) to a different one of the data storage devices comprising the data storage device assembly, such as assembly 810 (FIG. 8), installed in step 1180 (FIG. 11). For example using the illustrated embodiment of FIG. 9, step 1230 comprises copying the first and second data from data storage device 520 to data storage device 820, and comprises copying the first and second data from data storage device 620 to data storage device 610, and comprises copying the first and second data from data storage device 640 to data storage device 630.

Applicants' method transitions from step 1230 to step 1240 wherein the method forms a fourth storage array, such as storage array 920, comprising the third array, such as array 710 (FIGS. 7, 8), in combination with the data storage device assembly, such as assembly 810 (FIG. 8), installed in step 1180 (FIG. 11), wherein that fourth storage assembly does not comprise the data storage device assembly, such as assembly 375, previously designated a spare assembly in step 1020 (FIG. 10). In certain embodiments, step 1240 is performed by a processor, such as processor 132 (FIG. 1) or processor 142 (FIG. 1), disposed in the data storage and retrieval system. In certain embodiments, step 1240 is performed by an initiator, such as initiator 205*a* (FIG. 2) or initiator 205*b* (FIG. 2), disposed in the data storage and retrieval system. In certain embodiments, step 1240 is performed by a host computer in communication with Applicants' data storage and retrieval system.

Applicants' method transitions from step 1240 to step 1250 wherein the method designates as a spare data storage device assembly the data storage device assembly, such as assembly 375, previously designated a spare assembly in step 1020 (FIG. 10), and previously configured in the third storage array of step 1120 (FIG. 11). In certain embodiments, step 1250 is performed by a processor, such as processor 132 (FIG. 1) or processor 142 (FIG. 1), disposed in the data storage and retrieval system. In certain embodiments, step 1250 is performed by an initiator, such as initiator 205*a* (FIG. 2) or initiator 205*b* (FIG. 2), disposed in the data storage and retrieval system. In certain embodiments, step 1250 is performed by a host computer in communication with Applicants' data storage and retrieval system. Applicants' method transitions from step 1250 to step 1030 and continues as described herein.

In certain embodiments, individual steps recited in FIGS. 10, 11, and/or 12, may be combined, eliminated, or reordered.

In certain embodiments, Applicants' invention includes instructions residing in memory disposed in central processing/cache elements 130 (FIGS. 1, 2) and 140 (FIGS. 1, 2), where those instructions are executed by a processor, such as processor 132 (FIG. 1) and/or 142 (FIG. 1), respectively, to perform steps 1020, 1030, 1040, 1050, 1060, 1070, 1080, and/or 1090, recited in FIG. 10, and/or steps 1110 and/or 1120 recited in FIG. 11, and/or steps 1210, 1220, 1230, 1240, and/or 1250, recited in FIG. 12.

In other embodiments, Applicants' invention includes instructions residing in any other computer program product, where those instructions are executed by a computer external to, or internal to, system 100, to perform steps 1020, 1030, 1040, 1050, 1060, 1070, 1080, and/or 1090, recited in FIG. 10, and/or steps 1110 and/or 1120 recited in FIG. 11, and/or steps 1210, 1220, 1230, 1240, and/or 1250, recited in FIG. 12. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to reconfigure a storage array, comprising the steps of:
    supplying a data storage and retrieval system comprising (N) data storage device assemblies, wherein each of said (N) data storage device assemblies comprises (M) data storage devices, wherein (N) is greater than or equal to 2, and wherein (M) is greater than or equal to 2;
    configuring said (N) data storage device assemblies to comprise a spare data storage device assembly, and a first storage array comprising (N−1) data storage device assemblies;
    detecting a failed data storage device, wherein said failed data storage device is disposed in a (j)th data storage device assembly, wherein said first storage array comprises said (j)th data storage device assembly;
    writing first data to said first storage array before detecting said failed data storage device;
    forming a second storage array comprising said first storage array, except said failed data storage device, in combination with a first data storage device disposed in said spare data storage device assembly;
    rebuilding on said first data storage device first data written to said failed data storage device;
    writing second data to said second storage array:
    copying first data and second data written to each operative data storage device disposed in said (i)th data storage device assembly to a different data storage device, other than said first data storage device, disposed in said spare data storage device assembly;
    forming a third storage array comprising said first storage array, except said (j)th data storage device assembly, in combination with said spare data storage device assembly;
    removing said (j)th data storage device assembly from said data storage and retrieval system;
    operative if said failed data storage device can be repaired, repairing said (j)th data storage device assembly by repairing said failed data storage device;
    operative if said failed data storage device cannot be repaired;
    providing a replacement data storage device;
    repairing said (j)th data storage device assembly by replacing said failed data storage device with said replacement data storage device.

2. The method of claim 1, wherein said supplying step further comprises supplying a data storage and retrieval system comprising a System Enclosure Services ("SES") processor interconnected with each of said (N) data storage device assemblies, wherein said detecting step is performed by said SES processor.

3. The method of claim 2, wherein:
    said supplying step further comprises supplying a data storage and retrieval system comprising an initiator interconnected with said SES processor; and
    wherein said configuring step and said forming a second storage array step are performed by said initiator.

4. The method of claim 1, wherein:
    said supplying step further comprises supplying a data storage and retrieval system comprising a SES processor interconnected with each of said (N) data storage device assemblies, and an initiator interconnected with said SES processor; and
    said copying step and said forming a third storage array step are performed by said initiator.

5. The method of claim 4, further comprising the step of installing said repaired (j)th data storage device assembly in said data storage and retrieval system.

6. The method of claim 5, further comprising the step of designating said repaired (j)th data storage device assembly as a spare data storage device assembly.

7. The method of claim 6, wherein said designating step is performed by said initiator.

8. The method of claim 5, further comprising the steps of:
    copying first data and second data written to each data storage device disposed in said spare data storage device assembly to a different data storage device disposed in said repaired (j)th data storage device assembly;
    forming a fourth storage array comprising said third storage array, except said spare data storage device assembly, in combination with said repaired (j)th data storage device assembly.

9. An article of manufacture comprising an information storage medium having computer readable program code disposed therein and useable with a computer processor to reconfigure a storage array disposed in a data storage and retrieval system comprising (N) data storage device assemblies, wherein each of said (N) data storage device assemblies comprises (M) data storage devices, wherein (N) is greater than or equal to 2, and wherein (M) is greater than or equal to 2, the computer readable program code comprising a series of computer readable program steps to effect:

configuring said (N) data storage device assemblies to comprise a spare data storage device assembly and a first storage array comprising (N−1) data storage device assemblies;

detecting a failed data storage device, wherein said failed data storage device is disposed in a (j)th data storage device assembly, wherein said first storage array comprises said (j)th data storage device assembly;

writing first data to said storage array before detecting said failed data storage device;

forming a second storage array comprising said first storage array, except said failed data storage device, in combination with a first data storage device disposed in said spare data storage device assembly;

rebuilding on said first data storage device first data written to said failed data storage device;

writing second data to said second storage array;

copying first data and second data from each operable data storage device disposed in said (j)th data storage device assembly to a different data storage device, other than said first data storage device, disposed in said spare data storage device assembly;

forming a third storage array comprising said first storage array, except said (j)th data storage device assembly, in combination with said spare data storage device assembly;

copying first data and second data from each data storage device disposed in said spare data storage device assembly to a different data storage device disposed in a repaired (j)th data storage device assembly;

forming a fourth storage array comprising said third storage array, except said spare data storage device assembly, in combination with said repaired (j)th data storage device assembly.

10. The article of manufacture of claim 9, wherein said data storage and retrieval system comprises a System Enclosure Service ("SES") processor interconnected with each of said (N) data storage device assemblies, and an initiator interconnected with said SES processor.

11. The article of manufacture of claim 9, said computer readable program code further comprising a series of computer readable program steps to effect installing a repaired (j)th data storage device assembly in said data storage and retrieval system.

12. The article of manufacture of claim 11, said computer readable program code further comprising a series of computer readable program steps to effect designating said repaired (j)th data storage device assembly as a spare data storage device assembly.

13. A computer program product encoded in an information storage medium and usable with a programmable computer processor to reconfigure a storage array disposed in a data storage and retrieval system comprising (N) data storage device assemblies, wherein each of said (N) data storage device assemblies comprises (M) data storage devices, wherein (N) is greater than or equal to 2, and wherein (M) is greater than or equal to 2, comprising:

computer readable program code which causes said programmable computer processor to configure said (N) data storage device assemblies to comprise a spare data storage device assembly and a first storage array comprising (N−1) data storage device assemblies;

computer readable program code which causes said programmable computer processor to detect a failed data storage device, wherein said failed data storage device is disposed in a (j)th data storage device assembly, wherein said first storage array comprises said (j)th data storage device assembly;

computer readable program code which causes said programmable computer processor to write first data to said storage array before detecting said failed data storage device;

computer readable program code which causes said programmable computer processor to form a second storage array comprising said first storage array, except said failed data storage device, in combination with a first data storage device disposed in said spare data storage device assembly;

computer readable program code which causes said programmable computer processor to rebuild on said first data storage device first data written to said failed data storage device;

computer readable program code which causes said programmable computer processor to write second data to said second storage array;

computer readable program code which causes said programmable computer processor to copy first data and second data from each operative data storage device disposed in said (j)th data storage device assembly to a different data storage device, other than said first data storage device, disposed in said spare data storage device assembly;

computer readable program code which causes said programmable computer processor to form a third storage array comprising said first storage array, except said (j)th data storage device assembly, in combination with said spare data storage device assembly;

computer readable program code which causes said programmable computer processor to copy first data and second data from each data storage device disposed in said spare data storage device assembly to a different data storage device disposed in a repaired (j)th data storage device assembly;

computer readable program code which causes said programmable computer processor to forming a fourth storage array comprising said third storage array, except said spare data storage device assembly, in combination with said repaired (j)th data storage device assembly.

14. The computer program product of claim 13, wherein said data storage and retrieval system comprises a SES processor interconnected with each of said (N) data storage device assemblies and an initiator interconnected with said SES processor.

15. The computer program product of claim 13, further comprising computer readable program code which causes said programmable computer processor to detect a repaired (j)th data storage device assembly installed in said data storage and retrieval system.

16. The computer program product of claim 15 further comprising computer readable program code which causes said programmable computer processor to designate said repaired (j)th data storage device assembly as a spare data storage device assembly.

* * * * *